United States Patent [19]

Rozman et al.

[11] Patent Number: 5,444,349
[45] Date of Patent: Aug. 22, 1995

[54] STARTING CONTROL FOR AN ELECTROMAGNETIC MACHINE

[75] Inventors: Gregory I. Rozman, Rockford; Michael J. Hanson, Loves Park; Albert L. Markunas, Roscoe, all of Ill.

[73] Assignee: Sundstrand Corporation, Rockford, Ill.

[21] Appl. No.: 60,960

[22] Filed: May 12, 1993

[51] Int. Cl.⁶ .............................................. H02P 1/46
[52] U.S. Cl. ................................... 318/716; 318/721; 318/254; 318/431
[58] Field of Search ............... 318/138, 254, 430, 431, 318/437, 438, 714, 715, 716, 719, 721, 722, 724, 798, 799, 800, 801, 778, 780

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,330,743 | 5/1982 | Glennon | 318/138 X |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand et al. | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,029,263 | 7/1991 | Rozman | 318/714 |
| 5,040,366 | 8/1991 | Schulze | 60/39.08 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,140,245 | 8/1992 | Stacey | 318/723 |
| 5,283,471 | 2/1994 | Raad | 290/46 |

FOREIGN PATENT DOCUMENTS 2206751 1/1989 United Kingdom .

OTHER PUBLICATIONS

E. Iizuka, et al., *IEEE Transactions on Industry Applications*, vol. 1A-21, No. 4, May/Jun. 1985.
Furuhashi, et al., *IEEE Transactions on Industrial Electronics*, vol. 39, No. 2, Apr. 1992.
A. E. Fitzgerald, et al., *Electric Machinery*, pp. 246–249, 270–271, McGraw-Hill Publishing, New York, N.Y. Fifth Edition.

*Primary Examiner*—Bentsu Ro

[57] ABSTRACT

A control for operating an electromagnetic machine in a starting mode of operation detects a magnitude of a parameter of power applied to an armature winding of the electromagnetic machine relative to a stationary frame of reference and converts the detected parameter magnitude into field and torque producing components relative to a rotating frame of reference. A power source coupled to the armature winding is controlled during operation in the starting mode such that a rotor of the machine is accelerated.

22 Claims, 4 Drawing Sheets

STARTING CONTROL FOR AN ELECTROMAGNETIC MACHINE

TECHNICAL FIELD

The present invention relates generally to electromagnetic machines, and more particularly to a starting control for operating an electromagnetic machine in a starting mode of operation.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a starting mode whereupon the generator develops electrical power.

As is known, an electromagnetic machine may be operated as a motor to convert electrical power into motive power. Thus, in those applications where a source of motive power is required for engine starting, such as in an APU system, it is possible to dispense with the need for the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

The use of single-phase AC excitation during operation in the starting mode can create problems due to the low power transfer capability across the exciter air gap. In order to provide sufficient main generator field current, a high AC voltage must be applied to the exciter field winding, in turn creating potential corona problems. It is, therefore, desirable to reduce the initial starting time, during which high AC voltage is present, to a minimum. It is also necessary that available input power not be exceeded during the start operation.

Lafuze, U.S. Pat. No. 3,902,073 and Stacey, U.S. Pat. No. 5,140,245 disclose starting systems for electromagnetic machines.

Papers entitled, "Microcomputer Control for Sensorless Brushless Motor" by E. Iizuka, et al., *IEEE Transactions on Industry Application*, vol. IA-21, No. 4, May/June 1985 and "Position—and—Velocity Sensorless Control for Brushless DC Motor Using an Adaptive Sliding Mode Observer" by Furuhashi, et al., *IEEE Transactions on Industrial Electronics*, Vol. 39, No. 2, April 1992, disclose techniques for detecting rotor position of a motor for properly commutating currents flowing in the windings of an electromagnetic machine.

Other controls for operating a brushless generator in a starting mode of operation are disclosed in Dhyanchand, U.S. Pat. No. 4,939,441, Dhyanchand, U.S. Pat. No. 5,013,929 and Glennon, et al., U.S. Pat. No. 5,068,590, all assigned to the assignee of the instant application.

SUMMARY OF THE INVENTION

In accordance with the present invention, a control for operating an electromagnetic machine in a starting mode of operation brings the machine up to a certain speed in a short period of time and controls the power applied to the machine.

More particularly, according to one aspect of the present invention, a control for operating an electromagnetic machine in a starting mode of operation includes means for detecting a magnitude of a parameter of power applied to an armature winding of the machine relative to a stationary frame of reference and a converter which converts the detected parameter magnitude into field and torque producing components relative to a rotating frame of reference. Means are coupled between the converter and a power source coupled to the armature winding and responsive to the field and torque producing components for controlling the power source during operation in the starting mode such that a rotor of the machine is rotated.

Preferably, the controlling means includes a first summer which sums the field producing component with a field command to derive a first error signal, a second summer which sums the torque producing component with a torque command to derive a second error signal and means coupled to the first and second summers for obtaining voltage commands for the power source from the first and second comparison signals.

The obtaining means preferably comprises a further converter which converts the first and second error signals into the voltage commands.

In accordance with a specific aspect of the present invention, first means may be provided for deriving the field command for one of the power component magnitudes together with a third summer which sums the other of the power component magnitudes with a command to obtain a third error signal. The control may further include means for developing a start command signal, a selector for passing either the third error signal or a start command signal to an output thereof and second means for deriving the torque command from the signal at the output of the selector.

Preferably, the developing means includes a first start signal circuit which produces a first start signal, a second start signal circuit which produces a second start signal and a switch which passes either the first start signal or the second start signal to the selector as the start command signal.

Also in accordance with the preferred embodiment, the first start signal circuit comprises third means for deriving speed and position reference signals representing a reference speed and reference position, respectively, for the rotor, an estimator which develops speed and position estimate signals representing estimated rotor speed and position, respectively, and fourth means coupled to the third deriving means and the estimator for deriving the first start signal from the speed and position reference signals and the speed and position estimate signals.

Further in accordance with this specific aspect of the present invention, the fourth deriving means preferably includes a fourth summer which sums the speed reference signal with the speed estimate signal to obtain a speed error signal, a fifth summer which sums the position reference signal with the position estimate signal to obtain a position error signal, a sixth summer which sums the speed error signal with the position error signal and a limiter coupled to the sixth summer which produces the first start signal.

Still further, a resolver may be provided which produces a resolver signal representing rotor position. Also, the estimator preferably includes a seventh summer which sums the resolver signal with the position estimate signal to obtain a position deviation signal, a scaler which multiplies the first start signal with a signal dependent upon the inertia of the rotor and a first conditioner which conditions the position deviation signal to produce a first conditioned signal. The estimator preferably further includes a second conditioner which conditions the position deviation signal to produce a second conditioned signal, an eighth summer which sums an output produced by the scaler with the first conditioned signal to produce an acceleration signal, a first integrator which integrates the acceleration signal to produce the speed estimate signal, a ninth summer which sums the speed estimate signal with the second conditioned signal and a second integrator which integrates an output produced by the ninth summer to produce the position estimate signal.

Preferably, the third deriving means includes a tenth summer which sums a speed command signal with the speed reference signal, a function generator coupled to the tenth summer, a third integrator coupled to the function generator which produces the speed reference signal and a fourth integrator coupled to the third integrator which produces the position reference signal.

In accordance with a further aspect of the present invention, a control for operating a brushless generator in a starting mode of operation includes means for detecting a magnitude of current applied to a main generator portion armature winding relative to a stationary frame of reference and a converter responsive to the detecting means for converting the detected current magnitude into field and torque producing components relative to a rotating frame of reference. Means are coupled between the converting means and first and second controllable power sources coupled to the armature winding and an exciter field winding and are responsive to the field and torque producing components for controlling the power sources during operation in the starting mode such that a rotor of the brushless generator is rotated.

The control of the present invention is capable of bringing a prime mover up to self-sustaining speed in a short period of time and can control the amount of power drawn from a power source so that power limits are not exceeded.

DESCRIPTION OF THE PREFERRED EMBODIMENT

Figure 1A:
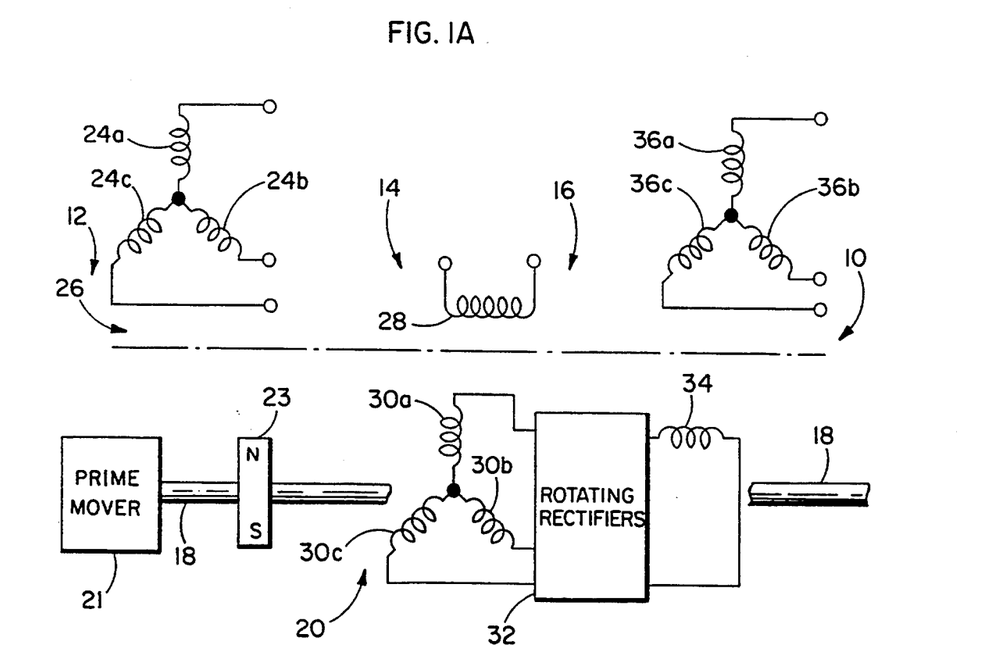
FIG. 1A comprises a combined block and schematic diagram of a brushless, synchronous generator.

Referring now to FIG. 1A, a brushless, synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU) 22, although the present invention is equally useful in other prime mover/generator applications.

The rotor 20 carries one or more permanent magnets 23 which form poles for the PMG 12. Rotation of the motive power shaft 18 causes relative movement between the magnetic flux produced by the permanent magnet 23 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

Figure 1B:
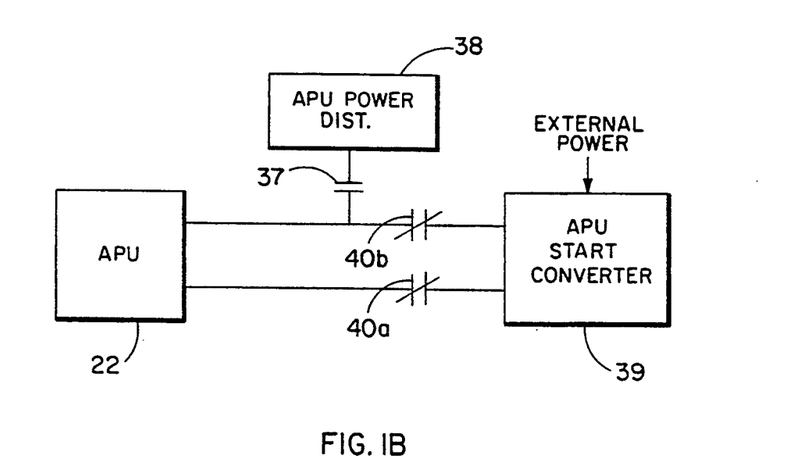
FIG. 1B comprises a block diagram of an APU system together with a start converter.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B, the AC voltages are supplied through a contactor set 37 to an APU power distribution network 38 and thence to one or more loads (not shown).

Often, it is desirable to use the brushless generator 10 as a motor to bring the prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39 which receives external electrical power and which is connected by contactor sets 40a, 40b to the exciter field winding 28 and the armature windings 36a–36c, respectively. Various methods have been devised for controlling the power supplied to the main generator field winding 34 via the exciter 14 and the power applied to the armature windings 36a–36c other than those described herein. Such other methods could be used in place of those described herein to accomplish the desired results, as should be evident to one of ordinary skill in the art, without departing from the spirit and scope of the present invention.

Figure 2A:
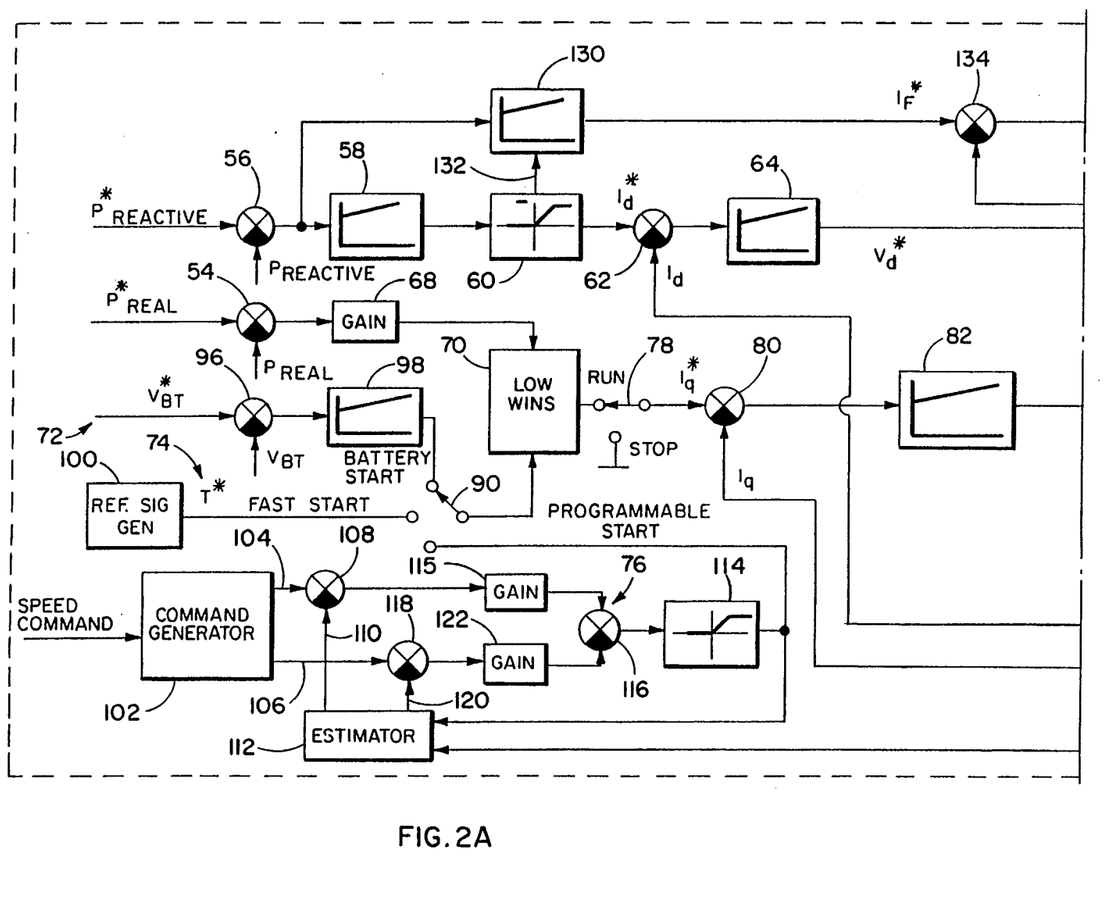
FIGS. 2A and 2B comprise a block diagram of one embodiment of the control of the present invention.
Figure 2B:
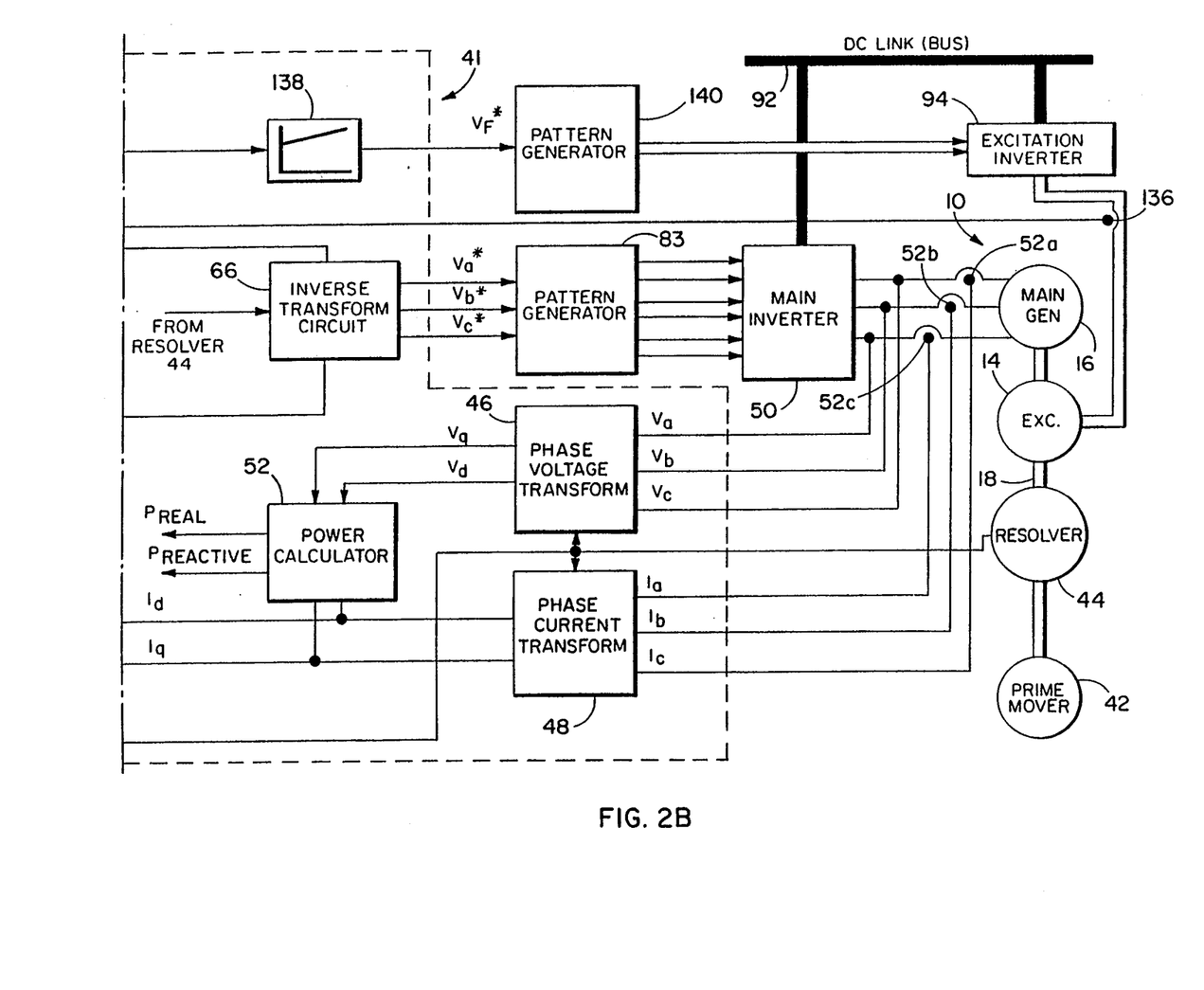

FIGS. 2A and 2B illustrate the exciter 14, the main generator 16 and the motive power shaft 18 of the generator 10 together with a starting system control 41 for operating the generator 10 in a starting mode to convert electrical power into motive power for starting a prime mover 42. Referring to FIG. 2B, the starting system control 41 includes a rotor position detector in the form of a resolver 44 which develops a signal representing the position of the motive power shaft 18, and hence the rotor 20. The resolver signal is delivered to a phase voltage transformation circuit 46 and a phase current transformation circuit 48. The phase voltage transformation circuit 46 is responsive to phase voltages $V_a$, $V_b$ and $V_c$ developed by a first power source or power converter in the form of a pulse-width modulated (PWM) main inverter 50. The main inverter 50 is of the three-phase type and includes six controllable power switches and six flyback diodes connected in a conventional bridge configuration. The phase current transformation circuit 48 is responsive to signals $I_a$, $I_b$ and $I_c$ representing the magnitudes of phase currents developed by the main inverter 50, as detected by current sensors 52a–52c. The signals supplied to the circuits 46, 48 are expressed in terms relative to the stationary frame of reference of the stator 26. The circuits 46 and 48 are converters which implement Park's transformation to convert these signals into signals $V_d$, $V_q$ and $I_d$, $I_q$ in the d-q (or direct-quadrature) rotating frame of reference relative to the rotor 20.

The signals $V_d$, $V_q$ and $I_d$, $I_q$ are provided to a power calculator 52 which computes real and reactive power delivered to the generator according to the following equations:

$$P_{real} = I_d V_d + I_q V_q$$

$$P_{reactive} = -I_q V_d + I_d V_q$$

Referring to FIG. 2A, the signals representing the real and reactive power magnitudes are supplied to summers 54, 56, which subtract such signals from signals representing a commanded real power and a commanded reactive power, respectively. The output of the summer 56 is conditioned by a proportional-integral (PI) regulator 58, limited by a limiter 60 and supplied as a field command signal to a non-inverting input of a summer 62. An inverting input of the summer 62 receives the signal $I_d$ developed by the phase current transformation circuit 48 (FIG. 2B). The summer 62 develops an error signal representing the deviation of the field producing component developed by the main inverter 50 from a commanded field component magnitude and the error signal is conditioned by a PI regulator 64 and supplied to a first input of an inverse transformation circuit 66.

The output of the summer 54, representing the deviation of the real power magnitude from a commanded power magnitude, is processed by a gain unit 68 and is provided to a selector comprising a low wins circuit 70. The low wins circuit 70 further receives an input from one of three start circuits 72, 74 and 76, described in greater detail hereinafter. The low wins circuit 70 supplies the signal having the lesser magnitude through a run-stop switch 78 to a non-inverting input of a summer 80. The signal provided by the low wins circuit 70 represents a commanded torque producing component $I_q^*$ to be developed by the main inverter 50. The signal $I_q$ representing the magnitude of the torque producing component actually produced by the main inverter 50 is supplied to an inverting input of the summer 80 and the resulting error signal, representing the deviation of the actual and commanded torque producing component magnitudes, is processed by a PI regulator 82 and supplied to a second input of the inverse transformation circuit 66 (FIG. 2B).

The inverse transformation circuit 66 is responsive to the output of the resolver 44 and converts the signals developed by the PI regulators 64, 82 into three voltage commands $V_a^*$, $V_b^*$ and $V_c^*$ relative to a stationary frame of reference. The commands $V_a^*$, $V_b^*$ and $V_c^*$ are provided to a pattern generator 83 (FIG. 2B) which in turn develops six switch control patterns for the six switches in the three phase main inverter 50.

The run-stop switch 78 is used in certain circumstances, such as a failed start attempt, when the excitation to the system is suspended and then reapplied. In such a case, the run-stop switch 78, when set to the stop position, suspends only the torque producing component command $I_q^*$ by setting it to zero so that no motive power is developed by the generator 10. By not also setting the field producing component $I_d^*$ to zero, time that would otherwise be required to regenerate the field during restart is saved. The run-stop switch 78 is optional, and the particular manner in which it is implemented is not considered important to the invention.

The start circuit 72 develops a start signal which is provided by a switch 90 to the low wins circuit 70 in the event that DC power is to be supplied by a battery (not shown) over a DC bus 92 (FIG. 2B) to the main inverter 50 and a PWM excitation inverter 94 coupled to the field winding 28 of the exciter 14. A signal $V_{BT}$ representing the actual magnitude of battery voltage is supplied to a summer 96 which subtracts such signal from a commanded battery voltage signal $V_{BT}^*$. The resulting error signal is processed by a PI regulator 98 and is supplied by the switch 90 to the low wins circuit 70 as the start signal. This start signal ensures that the acceleration of the rotor matches the battery impedance so that the power drawn from the battery during the starting mode of operation does not exceed a level which would cause the battery voltage to drop to a level which would impair the operation of other loads connected thereto.

It should be noted that the excitation inverter 94 may be of the half-bridge or full-bridge type. In the former case, the inverter 94 includes two controllable power switches coupled to opposite ends of the field winding 28 together with associated flyback diodes.

Referring to FIG. 2A, the start circuit 74 comprises a reference signal generator 100 which develops a start signal that is supplied by the switch 90 to low wins circuit 70 in the event that a fast start cycle is to be implemented. The reference signal generator 100 develops a waveform of appropriate waveshape, such as a stepped waveform that quickly rises from zero volts up to a constant level of appropriate magnitude which in turn causes the main inverter 50 and the excitation inverter 94 to bring the generator 10 and the prime mover 42 up to a desired speed in as rapid a fashion as possible.

The start circuit 76 provides a programmable start signal to the switch 90 and the low wins circuit 70. A command generator 102 is responsive to a speed command signal, which again may comprise a stepped waveform that quickly rises from zero volts up to a constant voltage of appropriate magnitude. Where the generator 10 is part of a gas turbine engine, the speed command signal may be generated based in part on the gas turbine temperature as detected by a temperature sensor (not shown). In response to the speed command signal, the command generator 102 develops a speed reference signal on a line 104 and a position reference signal on a line 106. The signal on the line 104 is supplied to a summer 108 which in turn subtracts a signal appearing on a line 110 therefrom. The signal on the line 110 is developed by an estimator 112 which is in turn responsive to the resolver output signal and a signal developed by a limiter 114 of the start circuit 76. The signal on the line 110 represents the estimated speed of the rotor 20. The summer 108 develops a speed error signal which is processed by a gain unit 115 and is supplied to a noninverting input of a summer 116.

The signal on the line 106 is supplied to a non-inverting input of a summer 118 and a signal developed on a line 120 by the velocity estimator 112 and representing the estimated position of the rotor 20 is subtracted therefrom. The resulting position error signal is processed by a gain unit 122 and is supplied to an inverting input of the summer 116. The summer 116 subtracts the compensated position error signal from the compensated speed error signal to develop a command signal which is limited by the limiter 114. The resulting limited torque command signal is supplied by the switch 90 to the low wins circuit 70. The command generator 102 and the velocity estimator 112 are described in greater detail hereinafter in connection with FIG. 3.

The reactive power error signal is supplied by the summer 56 to a PI regulator 130 which also receives an enable signal on a line 132 from the limiter 60. The output of the regulator 130 represents a commanded field current magnitude $I_F^*$ for the exciter 14 and is supplied to a noninverting input of a summer 134. An inverting input of the summer 134 receives a signal representing the current magnitude $I_F$ supplied by the excitation inverter 94 to the exciter field winding 28 as detected by a current sensor 136. The resulting field current error signal is processed by a PI regulator 138 (FIG. 2B) to produce a voltage command which is supplied to a pattern generator 140. The pattern generator 140 develops appropriate patterns for the switches in the inverter 94 to cause the exciter field current to approach the commanded current magnitude.

If desired, the elements 56, 58, 60 and 130 may be omitted from the circuit of FIG. 2A and a fixed command $I_d^*$ may be supplied to the summer 62. In addition, a function generator which is responsive to rotor speed to produce an excitation command may be coupled to the summer 134 to accomplish field weakening.

Figure 3:
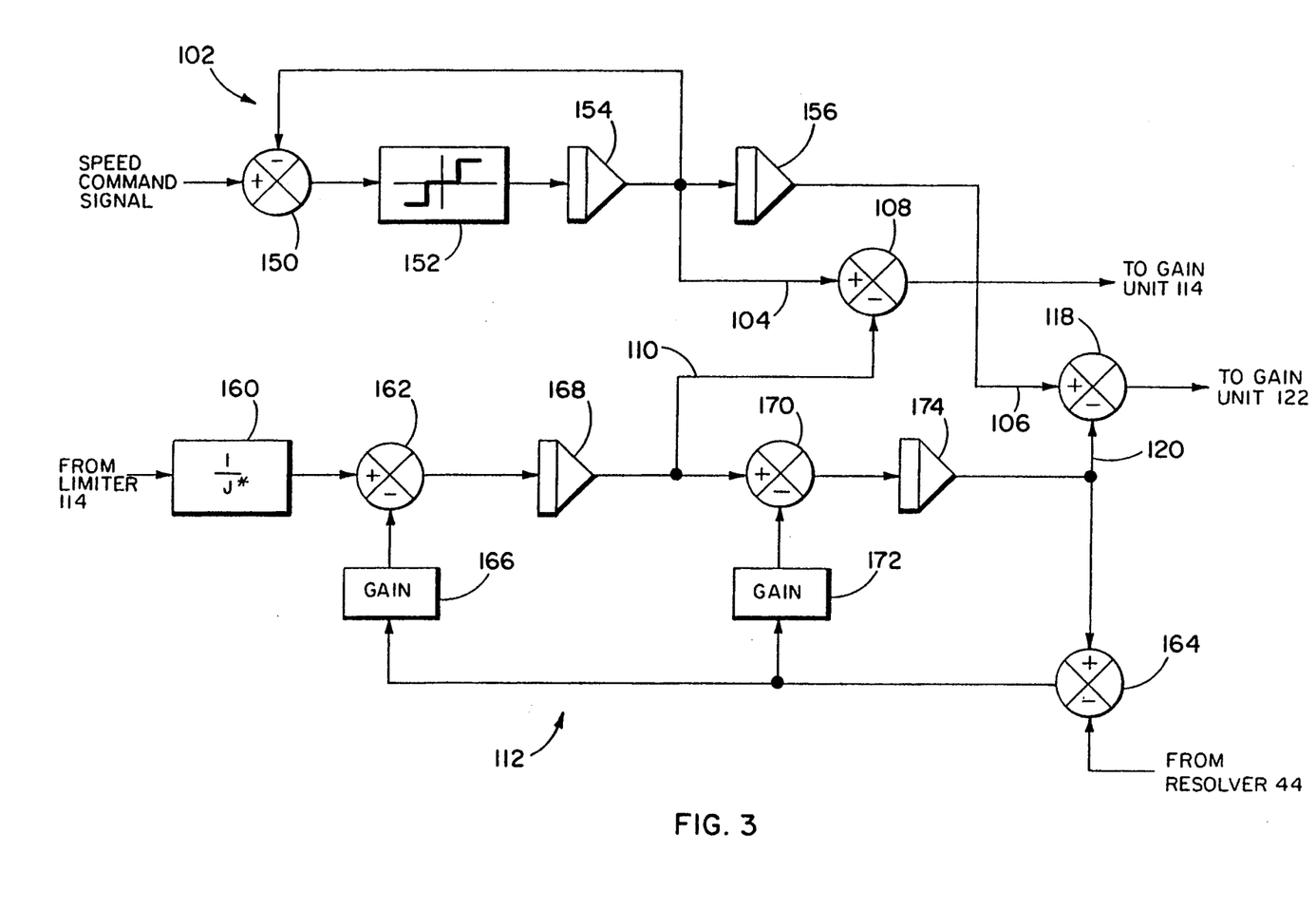
FIG. 3 comprises a block diagram of the command generator and velocity estimator of FIG. 2A.

Referring now to FIG. 3, the command generator 102 and the velocity estimator 112 are shown in greater detail together with the summers 108 and 118. The speed command signal is supplied to a noninverting input of a summer 150 that develops an output which is processed by a function generator 152. The function generator 152 converts the error signal developed by the summer 150 into an acceleration reference signal which is integrated by an integrator 154 and supplied to a further integrator 156 and 10 to the summer 108. The output of the integrator 154 is further supplied back to an inverting input of the summer 150, and hence the components 150, 152 and 154 comprise a closed-loop reference signal generator. The integrator 154 produces the speed reference signal which is provided to the noninverting input of the summer 108. The integrator 156 converts the speed reference signal into the position reference signal which is supplied over the line 106 to the noninverting input of the summer 118.

The output of the limiter 114 is supplied to a scaler 160 which multiplies the limiter signal with a signal representing the reciprocal of the inertia of the rotor 20. The resulting signal is provided to a noninverting input of a summer 162. The output of the resolver 44, which typically contains noise which may affect system operation, is supplied to an inverting input of a summer 164 which further includes a noninverting input which receives the estimated position signal on the line 120. The resulting error signal developed by the summer 164 is processed by a gain unit 166 and is supplied to an inverting input of the summer 162. The output of the summer 162, which represents the estimated acceleration of the rotor 20, is integrated by an integrator 168 to produce the speed estimate signal on the line 110. The speed estimate signal is further supplied to a noninverting input of a summer 170. A gain unit 172 multiplies the error signal developed by the summer 164 and the resulting signal is provided to an inverting input of the summer 170. The output of the summer 170 is processed by a further integrator 174 which in turn produces the position estimate signal. The velocity estimator 112 avoids the noise problems associated with utilizing the output of the resolver 44 along together with a simple differentiator.

It should be noted that some or all of the components of the control 40 may be implemented in whole or in part by a digital signal processor or any other suitable hardware and/or software, as desired.

During starting operation, the control operates the generator 10 in two modes, referred to as the maximum torque per amp mode and the unity power factor mode. At low speeds, i.e., when rotor speed is less than approximately 5500 RPM, the maximum torque per amp mode is implemented, which reduces starting times at lower speed. At zero and low speeds, the field command signal $I_d^*$ is set by the limiter 60 to the value which provides the maximum torque per amp ratio, which value is a function of motor parameters. At increasing speeds, the reactive power increases. When the error signal at the summer 56 output becomes negative, the limiter 60 eventually allows the output of the PI regulator 58 to pass to the summer 62 and therefore increases the commutation angle which causes a reduction in torque. When an upper limit is reached by the limiter 60, an enable signal is provided over the line 132 to the regulator 130, enabling it to reduce the field command signal for the exciter. From this point, the field current supplied by the excitation inverter 94 is reduced inversely proportional to speed. The commutation angle is increased to maintain the required (commanded) reactive power level. When the commutation angle reaches its limit, a field current command performs this function by reducing the exciter field current to satisfy reactive power requirements.

The control of the present invention is capable of accelerating an electromagnetic machine rapidly so that the start sequence can be accomplished in a short period of time. Further, input power limiting is always available which is important specifically in the event of a battery start.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for operating an electromagnetic machine in a starting mode of operation wherein the electromagnetic machine has an armature winding and a rotor wherein the armature winding is capable of receiving electrical power from a controllable power source during the starting mode of operation, comprising:

means for detecting a magnitude of a parameter of power applied to the armature winding relative to a stationary frame of reference;

a converter responsive to the detecting means for converting the detected parameter magnitude into field and torque producing components relative to a rotating frame of reference; and means coupled between the converter and the power source and responsive to the field and torque producing components for controlling the power source during operation in the starting mode such that the rotor is rotated, said controlling means including:

a first summer which sums the field producing component with a field command to derive a first error signal, a second summer which sums the torque producing component with a torque command to derive a second error signal and means coupled to the first and second summers for obtaining voltage commands for the power source from the first and second error signals.

2. The control of claim 1, wherein the obtaining means comprises a further converter which converts the first and second error signals into the voltage commands.

3. The control of claim 1, further including means for calculating magnitudes of power components developed by the power source and means for deriving the field command and the torque command from the power component magnitudes.

4. The control of claim 3, wherein the calculating means develops a real power magnitude signal and a reactive power magnitude signal and wherein the deriving means includes a third summer which sums the real power magnitude signal with a real power command signal to obtain a third error signal, a fourth summer which sums the reactive power magnitude signal with a reactive power command signal to obtain a fourth error signal, first means for conditioning the third error signal to obtain the field command and second means for conditioning the fourth error signal to obtain the torque command.

5. The control of claim 1, further including means for calculating magnitudes of power components developed by the power source, first means for deriving the field command from one of the power component magnitudes, a third summer which sums the other of the power component magnitudes with a command to obtain a third error signal, means for developing a start command signal, a selector for passing either the third error signal or the start command signal to an output thereof and second means for deriving the torque command from the signal at the output of the selector.

6. The control of claim 5, wherein the developing means includes a first start signal circuit which produces a first start signal, a second start signal circuit which produces a second start signal and a switch which passes either the first start signal or the second start signal to the selector as the start command signal.

7. The control of claim 6, wherein the first start signal circuit comprises third means for deriving speed and position reference signals representing a reference speed and reference position, respectively, for the rotor, an estimator which develops speed and position estimate signals representing estimated rotor speed and position, respectively, and fourth means coupled to the third deriving means and the estimator for deriving the first start signal from the speed and position reference signals and the speed and position estimate signals.

8. The control of claim 7, wherein the fourth deriving means includes a fourth summer which sums the speed reference signal with the speed estimate signal to obtain a speed error signal, a fifth summer which sums the position reference signal with the position estimate signal to obtain a position error signal, a sixth summer which sums the speed error signal with the position error signal and a limiter coupled to the sixth summer which produces the first start signal.

9. The control of claim 8, further including a resolver which produces a resolver signal representing rotor position and wherein the estimator includes a seventh summer which sums the resolver signal with the position estimate signal to obtain a position deviation signal, a scaler which multiplies the first start signal with a signal dependent upon the inertia of the rotor, a first conditioner which conditions the position deviation signal to produce a first conditioned signal, a second conditioner which conditions the position deviation signal to produce a second conditioned signal, an eighth summer which sums an output produced by the scaler with the first conditioned signal to produce an acceleration signal, a first integrator which integrates the acceleration signal to produce the speed estimate signal, a ninth summer which sums the speed estimate signal with the second conditioned signal and a second integrator which integrates an output produced by the ninth summer to produce the position estimate signal.

10. The control of claim 9, wherein the third deriving means includes a tenth summer which sums a speed command signal with the speed reference signal, a function generator coupled to the tenth summer, a third integrator coupled to the function generator which produces the speed reference signal and a fourth integrator coupled to the third integrator which produces the position reference signal.

11. The control of claim 5, wherein the developing means includes a first start signal circuit which produces a first start signal, a second start signal circuit which produces a second start signal, a third start signal circuit which produces a third start signal and a switch which passes one of the first, second or third start signals to the selector as the start command signal.

12. A control for operating a brushless generator in a starting mode of operation wherein the generator has a main generator portion including an armature winding disposed in a stator and a field winding disposed on a rotor movable with respect to the stator and an exciter having an exciter field winding disposed in the stator and an armature winding disposed on the rotor and coupled to the main generator portion field winding wherein the main generator portion armature winding and the exciter field winding are capable of receiving electrical power from first and second controllable power sources, respectively, during the starting mode of operation, comprising:

means for detecting a magnitude of current applied to the main generator portion armature winding relative to a stationary frame of reference;

a converter responsive to the detecting means for converting the detected current magnitude into field and torque producing components relative to a rotating frame of reference; and means coupled between the converter and the first and second power sources and responsive to the field and torque producing components for controlling the power sources during operation in the starting mode such that the rotor is rotated, said controlling means including:

a first summer which sums the field producing component with a field command to derive a first error signal, a second summer which sums the torque producing component with a torque command to derive a second error signal and means coupled to the first and second summers for obtaining voltage commands for the first power source from the first and second error signals.

13. The control of claim 12, wherein the obtaining means comprises a further converter which converts the first and second error signals into the voltage commands.

14. The control of claim 12, further including means for calculating magnitudes of power components developed by the first power source and means for deriving the field command and the torque command from the power component magnitudes.

15. The control of claim 14, wherein the calculating means develops a real power magnitude signal and a reactive power magnitude signal and wherein the deriving means includes a third summer which sums the real power magnitude signal with a real power command signal to obtain a third error signal, a fourth summer which sums the reactive power magnitude signal with a reactive power command signal to obtain a fourth error signal, first means for conditioning the third error signal to obtain the field command and second means for conditioning the fourth error signal to obtain the torque command.

16. The control of claim 12, further including means for calculating magnitudes of power components developed by the first power source, first means for deriving the field command from one of the power component magnitudes, a third summer which sums the other of the power component magnitudes with a command to obtain a third error signal, means for developing a start command signal, a selector for passing either the third error signal or the start command signal to an output thereof and second means for deriving the torque command from the signal at the output of the selector.

17. The control of claim 16, wherein the developing means includes a first start signal circuit which produces a first start signal, a second start signal circuit which produces a second start signal and a switch which passes either the first start signal or the second start signal to the selector as the start command signal.

18. The control of claim 17, wherein the first start signal circuit comprises third means for deriving speed and position reference signals representing a reference speed and reference position, respectively, for the rotor, an estimator which develops speed and position estimate signals representing estimated rotor speed and position, respectively, and fourth means coupled to the third deriving means and the estimator for deriving the first start signal from the speed and position reference signals and the speed and position estimate signals.

19. The control of claim 18, wherein the fourth deriving means includes a fourth summer which sums the speed reference signal with the speed estimate signal to obtain a speed error signal, a fifth summer which sums the position reference signal with the position estimate signal to obtain a position error signal, a sixth summer which sums the speed error signal with the position error signal and a limiter coupled to the sixth summer which produces the first start signal.

20. The control of claim 19, further including a resolver which produces a resolver signal representing rotor position and wherein the estimator includes a seventh summer which sums the resolver signal with the position estimate signal to obtain a position deviation signal, a scaler which multiplies the first start signal with a signal dependent upon the inertia of the rotor, a first conditioner which conditions the position deviation signal to produce a first conditioned signal, a second conditioner which conditions the position deviation signal to produce a second conditioned signal, an eighth summer which sums an output produced by the scaler with the first conditioned signal to produce an acceleration signal, a first integrator which integrates the acceleration signal to produce the speed estimate signal, a ninth summer which sums the speed estimate signal with the second conditioned signal and a second integrator which integrates an output produced by the ninth summer to produce the position estimate signal.

21. The control of claim 20, wherein the second developing means includes a tenth summer which sums a speed command signal with the speed reference signal, a function generator coupled to the tenth summer, a third integrator coupled to the function generator which produces the speed reference signal and a fourth integrator coupled to the third integrator which produces the position reference signal.

22. The control of claim 16, wherein the developing means includes a first start signal circuit which produces a first start signal, a second start signal circuit which produces a second start signal, a third start signal circuit which produces a third start signal and a switch which passes one of the first, second or third start signals to the selector as the start command signal.

* * * * *